US012668172B2

(12) United States Patent
Yamasaki et al.

(10) Patent No.: US 12,668,172 B2
(45) Date of Patent: *Jun. 30, 2026

(54) HEADLIGHT CONTROLLER

(71) Applicant: SUBARU CORPORATION, Tokyo (JP)

(72) Inventors: Kentaro Yamasaki, Tokyo (JP); Makoto Kinoshita, Tokyo (JP); Noriaki Asano, Tokyo (JP); Shunichi Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 18/905,249

(22) Filed: Oct. 3, 2024

(65) Prior Publication Data

US 2025/0033556 A1 Jan. 30, 2025

Related U.S. Application Data

(63) Continuation of application No. PCT/JP2023/027821, filed on Jul. 28, 2023.

(51) Int. Cl.
*B60Q 1/08* (2006.01)
*B60Q 1/14* (2006.01)

(52) U.S. Cl.
CPC ............. *B60Q 1/085* (2013.01); *B60Q 1/143* (2013.01); *B60Q 2300/054* (2013.01); *B60Q 2300/41* (2013.01); *B60Q 2300/42* (2013.01)

(58) Field of Classification Search
None
See application file for complete search history.

(56) References Cited

U.S. PATENT DOCUMENTS 4,967,319 A * 10/1990 Seko ...................... B60Q 1/076
362/466
5,645,338 A * 7/1997 Kobayashi ............. B60Q 1/085
362/276

(Continued)

FOREIGN PATENT DOCUMENTS

JP H10-151987 A 6/1998
JP 2002-19517 A 1/2002

(Continued)

OTHER PUBLICATIONS

International Search Report dated Oct. 3, 2023, from corresponding International Application No. PCT/JP2023/027821 (non-English).

(Continued)

*Primary Examiner* — Kenneth B Wells
(74) *Attorney, Agent, or Firm* — Rimon P.C.

(57) ABSTRACT

A headlight controller controls a headlight unit that illuminates a predetermined range in front of a vehicle. The headlight controller includes an inter-vehicle distance obtainer, an illumination controller, and a light distribution controller. The inter-vehicle distance obtainer acquires an inter-vehicle distance from the vehicle on which the headlight unit is mounted to a vehicle in front traveling in front of the vehicle. The light distribution controller partially dims or shades a range corresponding to a position of the vehicle in front, within an illumination range of a high beam. When the inter-vehicle distance is less than a first distance, the illumination controller displaces downward by a predetermined amount at least an illumination range of a low beam out of the illumination range of the low beam and the illumination range of the high beam by the headlight unit, regardless of operation of the light distribution controller.

8 Claims, 3 Drawing Sheets

(56) References Cited

U.S. PATENT DOCUMENTS

| | | | |
|---|---|---|---|
| 6,550,944 B2 * | 4/2003 | Kusagaya ............. | F21S 41/689 |
| | | | 362/465 |
| 9,738,214 B2 | 8/2017 | Nakatani | |
| 2002/0003473 A1 * | 1/2002 | Makita ................. | B60Q 1/0023 |
| | | | 340/436 |
| 2015/0002015 A1 | 1/2015 | Hayakawa et al. | |
| 2023/0311744 A1 | 10/2023 | Yamamoto et al. | |
| 2025/0033556 A1 | 1/2025 | Yamasaki et al. | |
| 2025/0074294 A1 * | 3/2025 | Yamasaki ............. | B60Q 1/143 |

FOREIGN PATENT DOCUMENTS

| | | |
|---|---|---|
| JP | 2019-43260 A | 3/2019 |
| JP | 2022-12224 A | 1/2022 |
| JP | 2022-70295 A | 5/2022 |
| WO | 2022/131044 A1 | 6/2022 |

OTHER PUBLICATIONS

International Search Report dated Nov. 14, 2023, from corresponding International Application No. PCT/JP2023/032517.

* cited by examiner

[ FIG. 1 ]

[ FIG. 2 ]
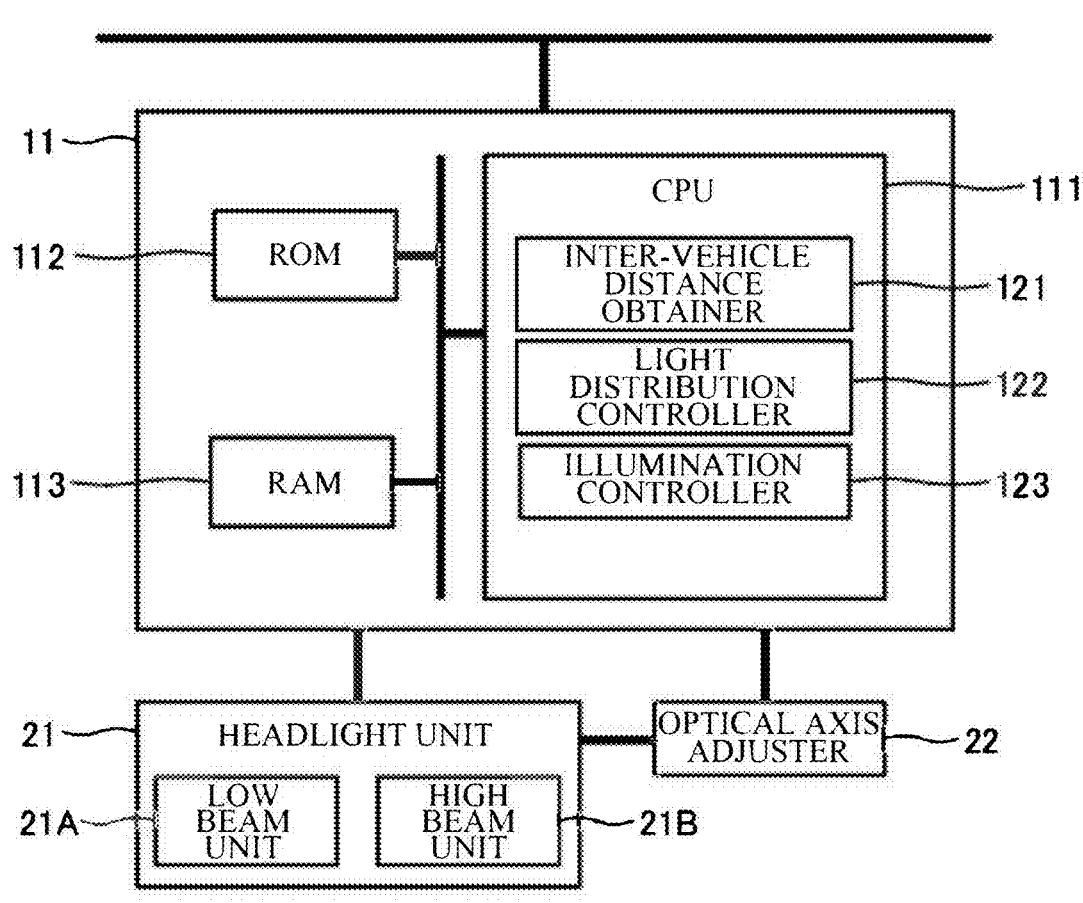

[ FIG. 3 ]
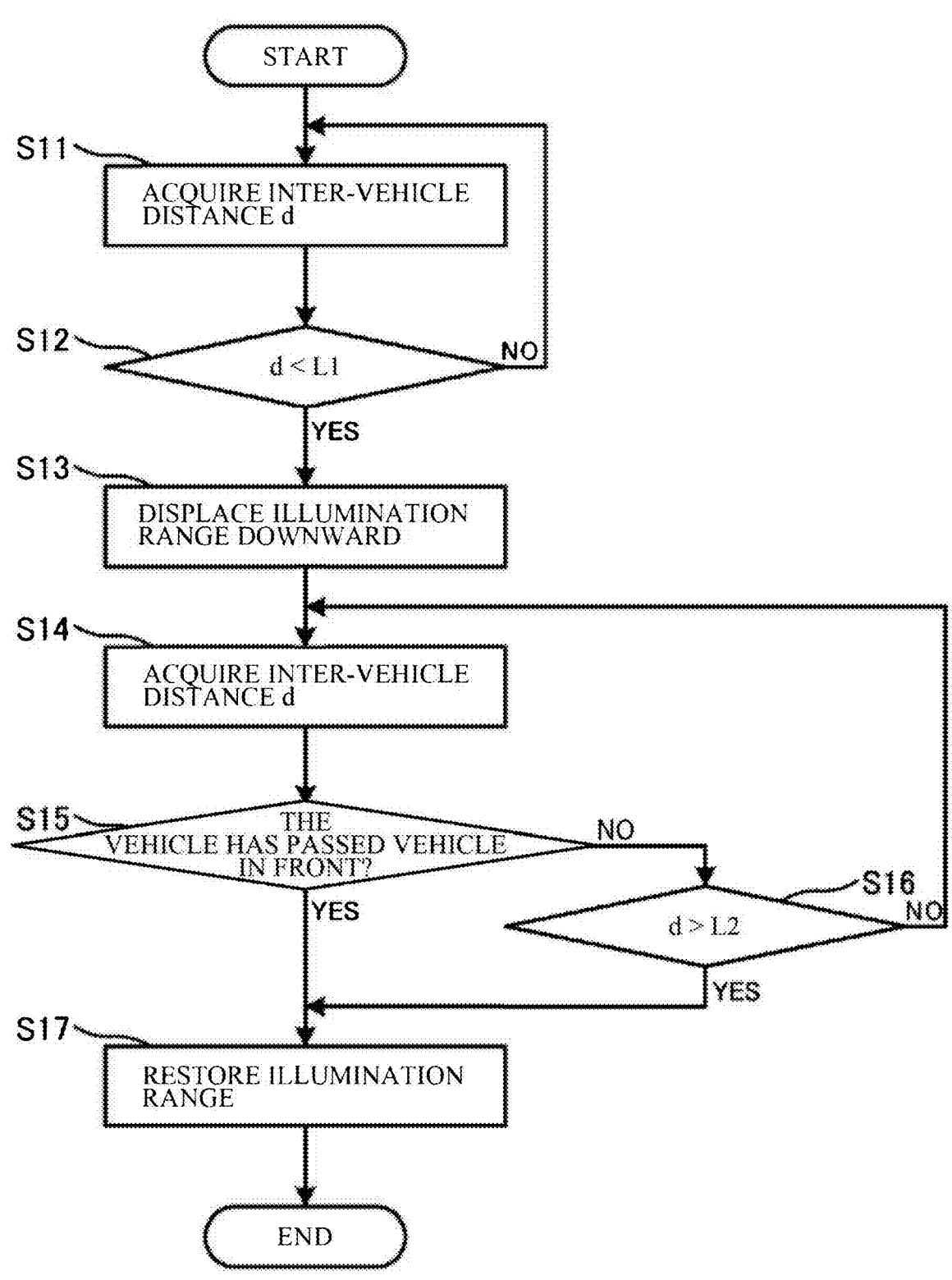

HEADLIGHT CONTROLLER

CROSS-REFERENCE TO RELATED APPLICATIONS

This application is continuation of International Application No. PCT/JP2023/027821, filed on Jul. 28, 2023, the entire contents of which are hereby incorporated by reference.

BACKGROUND

The disclosure relates to a headlight controller configured to control headlights mounted on a vehicle.

Headlights mounted on a vehicle are configured to send out light generated from a light source, frontward of the vehicle through an optical system such as lenses, while appropriately switching between a low beam and a high beam. Reference may be made to, for example, Japanese Unexamined Patent Application Publication (JP-A) No. 2019-43260. An illumination range of the low beam and an illumination range of the high beam by the headlights are each adjusted in accordance with the laws and regulations of the country in which the vehicle including the headlights travels. In general, the low beam is adjusted to allow an upper end of the illumination range, i.e., a cut-off line, to be level with or lower than a ground level of the headlights, to mitigate glare to a preceding vehicle or an oncoming vehicle. The high beam is adjusted to illuminate a higher and farther region than the low beam.

For example, a vehicle including headlights usually uses the high beam on nighttime travel to ensure visibility to a driver. When there are any vehicles in front, e.g., a preceding vehicle or an oncoming vehicle, or any pedestrians, the vehicle including the headlights uses the low beam to mitigate glare to the vehicles in front or the pedestrians.

When a light distribution control by an ADB (Adaptive Driving Beam) is performed on the headlights, while the vehicle is traveling with the high beam, the vehicle determines presence or absence of any vehicles in front or any pedestrians, and identifies their positions. The vehicle partially dims or darkens the illumination ranges of the headlights corresponding to the identified positions, to mitigate glare to the vehicles in front, etc.

SUMMARY

An aspect of the disclosure provides a headlight controller configured to control a headlight unit. The headlight unit is configured to illuminate a predetermined range in front of a vehicle. The headlight controller includes an inter-vehicle distance obtainer, an illumination controller, and a light distribution controller. The inter-vehicle distance obtainer is configured to acquire an inter-vehicle distance from the vehicle on which the headlight unit is mounted to a vehicle in front traveling in front of the vehicle. The illumination controller is configured to displace downward by a predetermined amount at least an illumination range of a low beam out of the illumination range of the low beam and an illumination range of a high beam by the headlight unit, when the inter-vehicle distance is less than a first distance. The light distribution controller is configured to partially dim or shade a range corresponding to a position of the vehicle in front, within the illumination range of the high beam. The illumination controller is configured to, when the inter-vehicle distance is less than the first distance, displace downward by the predetermined amount at least the illumination range of the low beam out of the illumination range of the low beam and the illumination range of the high beam by the headlight unit, regardless of operation of the light distribution controller.

An aspect of the disclosure provides a headlight controller configured to control a headlight unit including a light source. The headlight unit is configured to illuminate a predetermined range in front of a vehicle. The headlight controller includes circuitry configured to: acquire an inter-vehicle distance from the vehicle on which the headlight unit is mounted to a vehicle in front traveling in front of the vehicle; displace downward by a predetermined amount at least an illumination range of a low beam out of the illumination range of the low beam and an illumination range of a high beam by the headlight unit, when the inter-vehicle distance is less than a first distance; and partially dim or shade a range corresponding to a position of the vehicle in front, within the illumination range of the high beam. The circuitry is configured to, when the inter-vehicle distance is less than the first distance, displace downward by the predetermined amount at least the illumination range of the low beam out of the illumination range of the low beam and the illumination range of the high beam by the headlight unit, independent of whether the range corresponding to the position of the vehicle in front is partially dimmed or shaded, within the illumination range of the high beam.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 1 is a schematic diagram of an overall configuration of a vehicle control system including a headlight ECU according to an embodiment of the disclosure.

FIG. 2 is a schematic diagram of an overall configuration of the headlight ECU according to the embodiment of the disclosure.

FIG. 3 is a flowchart of control processing of a headlight unit by the headlight ECU according to the embodiment of the disclosure.

DETAILED DESCRIPTION

In a vehicle having a large vehicle height or a vehicle including high mounted headlights, the ground level of the headlights is relatively high. For that, the illumination ranges of the low beam and the high beam are also high. This may easily contribute to glare to the vehicles in front, etc.

As mentioned, the illumination range of the low beam is limited downward by adjusting the upper end of the illumination range to be level with or lower than the ground level of the headlights. However, when the ground level of the headlights is relatively high, even such a low beam may sometimes produce glare to the vehicles in front. Meanwhile, adjusting the illumination range of the low beam downward to cancel out the high ground level of the headlights may possibly lower visibility to a driver.

Moreover, when the illumination ranges of the headlights are located at a higher position, partially dimming or darkening the illumination ranges of the headlights by the ADB may sometimes fail to provide sufficient glare mitigation.

It is desirable to provide a headlight controller that makes it possible to optimize an illumination range even in a vehicle including headlights at a high ground level, and mitigate glare.

In the following, some example embodiments of the disclosure are described in detail with reference to the accompanying drawings. Note that the following description is directed to illustrative examples of the disclosure and not to be construed as limiting of the disclosure. Factors including, without limitation, numerical values, shapes, materials, components, positions of the components, and how the components are coupled to each other are illustrative only and not to be construed as limiting of the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to any embodiment of the disclosure are unillustrated in the drawings.

Figure 1:
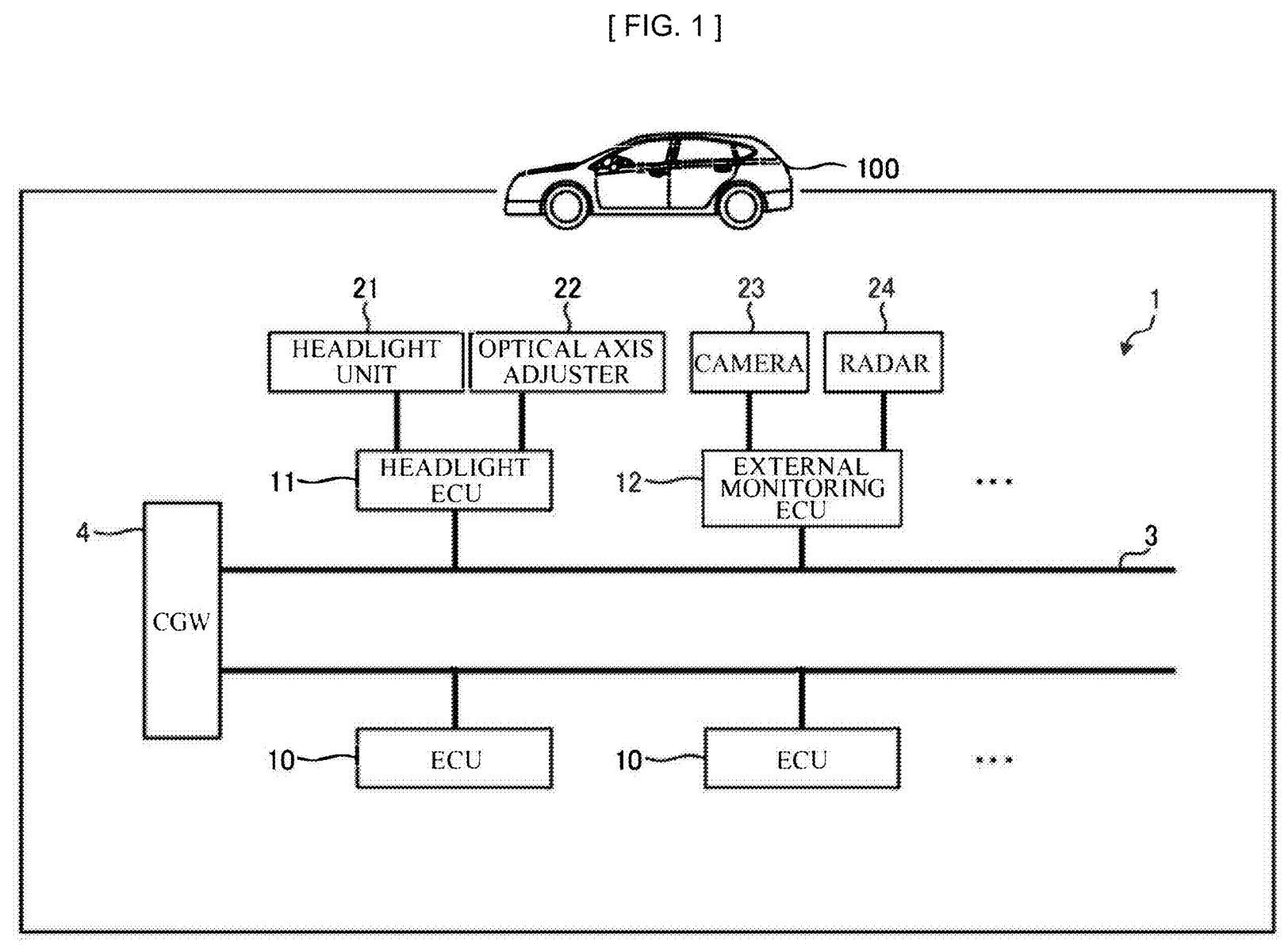

As illustrated in FIGS. 1 and 2, a headlight ECU 11 according to an embodiment of the disclosure is configured to control a headlight unit 21 to be attached to a vehicle 100. In one embodiment of the disclosure, the headlight ECU 11 may serve as a "headlight controller". The headlight unit 21 is described later. The headlight ECU 11 may serve as a portion of a vehicle control system 1 to be mounted on the vehicle 100.

The vehicle control system 1 may include multiple in-vehicle ECUs (Electronic Control Unit) 10 configured to control various electronic devices to be involved in travel of the vehicle 100. As some of the in-vehicle ECUs 10, the vehicle control system 1 may include, for example, the headlight ECU 11 and an external monitoring ECU 12.

The in-vehicle ECUs 10, the headlight ECU 11, the external monitoring ECU 12, etc. may be communicatably coupled to one another through an in-vehicle network 3 such as a CAN (Controller Area Network) or a LIN (Local Interconnect Network). The in-vehicle ECUs 10, the headlight ECU 11, the external monitoring ECU 12, etc. may be coupled to a central gateway (CGW) 4 as a relay device to constitute the vehicle control system 1.

The in-vehicle ECUs 10, the headlight ECU 11, and the external monitoring ECU 12 may be coupled to electronic devices as their respective control targets, and control operation of the electronic devices to which they are coupled, based on information, or data, to be acquired from the in-vehicle network 3. The in-vehicle ECUs 10 may each output, to the in-vehicle network 3, information indicating a state such as an operation state of the electronic devices to which they are coupled.

The in-vehicle ECUs 10, the headlight ECU 11, and the external monitoring ECU 12 may include, for example, a processor such as a CPU (Central Processing Unit) or an MPU (Micro Processing Unit), electric circuitry, and storage elements such as a RAM (Random Access Memory) and a ROM (Read Only Memory). A part or all of operation to be carried out by the in-vehicle ECUs 10 may be realized by hardware such as an ASIC (application specific integrated circuit), an FPGA (field-programmable gate array), or a GPU (Graphics Processing Unit).

In the following description, detailed description and illustration of the electronic devices, the in-vehicle ECUs 10, etc. that do not directly participate in the operation of the headlight ECU 11 are omitted.

The headlight ECU 11 may be coupled to the headlight unit 21 provided in a front part of the vehicle 100, and control the headlight unit 21. To the headlight ECU 11, an optical axis adjuster 22 may be coupled. The optical axis adjuster 22 may adjust an optical axis of the headlight unit 21 in accordance with an instruction from the headlight ECU 11. Details of the headlight ECU 11 are given later.

The headlight unit 21 may generally include a low beam unit 21A and a high beam unit 21B. The low beam unit 21A and the high beam unit 21B may be provided on each of front right side and front left side of the vehicle. The low beam unit 21A may send out a low beam and be called a headlight for passing. The high beam unit 21B may send out a high beam and be called a headlight for travel. The low beam unit 21A and the high beam unit 21B may each include a light source such as an LED, a reflector, and a lens, none of which are illustrated. The reflector may guide light emitted from the light source, frontward of the vehicle 100. The lens may cause illumination with the light emitted from the light source, in a predetermined light distribution pattern.

The low beam unit 21A may illuminate a range that is lower than an illumination range of the high beam and close to the vehicle 100, to mitigate glare to vehicles and pedestrians around the vehicle 100. Accordingly, an illumination range of the low beam by the low beam unit 21A may be set to make it possible to check a possible obstacle that may inhibit the travel of the vehicle 100, e.g., vehicles in front and pedestrians present at a distance of about 40 meters in front of the vehicle 100.

The high beam unit 21B may illuminate a farther range with higher intensity of illumination than the illumination range of the low beam, to enhance visibility of the driver while the vehicle 100 is traveling. Accordingly, the illumination range of the high beam by the high beam unit 21B may be set to make it possible to check a possible obstacle that may inhibit the travel of the vehicle 100, e.g., vehicles in front and pedestrians present at a distance of about 100 meters in front of the vehicle 100.

The optical axis adjuster 22 may include, for example, a driving mechanism such as an electric actuator, and adjust the optical axis of the low beam unit 21A and the optical axis of the high beam unit 21B by operating the driving mechanism in accordance with an instruction from the headlight ECU 11. Allowing the optical axis adjuster 22 to vertically swing the optical axis of the low beam unit 21A and the optical axis of the high beam unit 21B to change an angle of each optical axis with respect to a horizontal direction makes it possible to displace each illumination range.

The external monitoring ECU 12 may constitute, for example, a part of an ADAS (Advanced Driver-Assistance Systems) that assists in driving the vehicle 100. The external monitoring ECU 12 may monitor the external environment of the vehicle 100 by a sensor group included in the ADAS. The sensor group may include a camera 23, radar 24, and other various sensors. That is, the external monitoring ECU 12 may output, to the in-vehicle network 3, as peripheral information: images and various pieces of data acquired from the sensor group mentioned above; moving objects, structures, shapes of roads, etc. grasped based on the images and the various pieces of data; distances from the moving objects, the structures, the roads, etc. to the vehicle, and positional relation of the moving objects, the structures, the roads, etc., to the vehicle, without limitation. The moving objects may include pedestrians around the vehicle and other vehicles around the vehicle.

The camera 23 may be provided, for example, in an upper portion of a windshield of the vehicle 100 and at the vehicle-widthwise center of the windshield of the vehicle 100. The camera 23 may capture an image of a predetermined range in front of the vehicle 100. The radar 24 may be provided at multiple locations of the vehicle 100. The radar 24 may transmit radio waves of a predetermined wavelength, and receive reflected waves to measure a distance to an object such as another vehicle, a pedestrian, or a structure present in front of, behind, and sideward of the vehicle 100, and a direction of the object.

Headlight ECU

In the following, the headlight ECU 11 is described. In one embodiment of the disclosure, the headlight ECU 11 may serve as the "headlight controller". The headlight ECU 11 may refer to the information acquired from the in-vehicle ECUs mentioned above through the in-vehicle network 3, to control the headlight unit 21.

As illustrated in FIG. 2, the headlight ECU 11 may include a CPU (Central Processing Unit) 111, a ROM 112 and a RAM 113.

The CPU 111 may carry out various kinds of processing based on programs held in the ROM 112. In this embodiment, the CPU 111 may serve as an inter-vehicle distance obtainer 121, a light distribution controller 122, and an illumination controller 123 illustrated in FIG. 2 by reading the programs held in the ROM 112 into a memory such as the RAM 113 and executing the programs. In the following, the inter-vehicle distance obtainer 121, the light distribution controller 122, and the illumination controller 123 are described.

The inter-vehicle distance obtainer 121 acquires an inter-vehicle distance d from the vehicle 100 to a vehicle in front traveling in front of the vehicle 100. The vehicle in front may include an oncoming vehicle and a preceding vehicle. An oncoming vehicle is a vehicle that faces the vehicle 100 and travels in an opposite direction to a direction of advance of the vehicle 100. A preceding vehicle is a vehicle that travels ahead of the vehicle 100 in the same direction of advance as the vehicle 100.

For example, the inter-vehicle distance obtainer 121 is configured to acquire, from the external monitoring ECU 12, the inter-vehicle distance d as a distance from the vehicle 100 to the vehicle in front calculated based on the image of the predetermined range in front of the vehicle 100 captured by the camera 23. Alternatively, the inter-vehicle distance obtainer 121 is configured to acquire the inter-vehicle distance d measured based on the transmitted waves and the received waves by the radar 24. The inter-vehicle distance obtainer 121 may acquire the inter-vehicle distance d by acquiring the image captured by the camera 23 through the external monitoring ECU 12 and performing predetermined image processing on the image.

The light distribution controller 122 may set light distribution patterns for the low beam unit 21A and the high beam unit 21B to illuminate their respective illumination ranges, and output a driving signal in accordance with the set light distribution patterns to the headlight unit 21. Moreover, the light distribution controller 122 is configured to make a light distribution variable control called the ADB (Adaptive Driving Beam). In the following, the light distribution variable control is referred to as an ADB control. For example, when a vehicle in front is present while the vehicle 100 is traveling while sending out the high beam, the light distribution controller 122 may set the light distribution pattern by the ADB control to partially dim or shade a range corresponding to a position of the vehicle in front, etc. within the illumination range of the high beam unit 21B.

When the inter-vehicle distance d from the vehicle 100 to the vehicle in front acquired by the inter-vehicle distance obtainer 121 becomes equal to or less than a certain distance, that is, when the inter-vehicle distance d is less than a predetermined distance L1, the illumination controller 123 controls the headlight unit 21 to displace the illumination range downward. In this situation, the illumination controller 123 may displace the illumination range of the low beam downward by a predetermined amount, or alternatively, the illumination controller 123 may displace both the illumination range of the low beam and the illumination range of the high beam downward by the predetermined amount.

The illumination controller 123 controls the headlight unit 21 to displace the illumination range downward when the inter-vehicle distance d from the vehicle 100 to the vehicle in front is less than the predetermined distance L1 regardless of whether the light distribution controller 122 is carrying out the ADB control mentioned above.

The predetermined amount mentioned above, that is, amounts of displacement of the illumination range of the low beam and the illumination range of the high beam, may be determined in advance based on, for example, a ground level of the headlight unit 21 in the vehicle 100, and held in, for example, the ROM 112 of the headlight ECU 11. In addition, the illumination controller 123 may continuously acquire the ground level of the headlight unit 21 while traveling, based on a mounting position of the headlight unit 21 on the vehicle 100 and the information obtained from, for example, an unillustrated vehicle height sensor, and calculate the amount of displacement of each illumination range that optimizes the illumination range of the low beam and the illumination range of the high beam.

The illumination controller 123 may adjust the optical axes of the low beam unit 21A and the high beam unit 21B to displace the respective illumination ranges. In this case, the illumination controller 123 may determine an amount of adjustment for each of the optical axis of the low beam unit 21A and the optical axis of the high beam unit 21B in accordance with the amount of displacement of each illumination range, and output a driving signal indicating each amount of adjustment to the optical axis adjuster 22.

Moreover, after displacing downward the illumination range of the low beam, or after displacing both the illumination range of the low beam and the illumination range of the high beam, based on the inter-vehicle distance d being less than the predetermined distance L1, the illumination controller 123 may control the headlight unit 21 to restore each illumination range to a pre-displacement position in the following cases.

In a case where the vehicle in front is a preceding vehicle traveling ahead of the vehicle 100 in the same direction of advance as the vehicle 100, when the inter-vehicle distance d from the preceding vehicle to the vehicle 100 is larger than a predetermined distance L2, the illumination controller 123 may restore each illumination range to the pre-displacement position.

In a case where the vehicle in front is an oncoming vehicle with respect to the vehicle 100, after the vehicle 100 and the oncoming vehicle pass each other, the illumination controller 123 may restore each illumination range to the pre-displacement position.

This makes it possible to ensure the visibility of the driver of the vehicle 100 while mitigating glare to the vehicle in front, etc.

In the following, description is given of control processing of the headlight unit 21 by the headlight ECU 11 configured as described above, with reference to a flowchart in FIG. 3.

In an environment in which the outside is dark, e.g., at nighttime, the vehicle 100 travels while sending out the low beam or the high beam from the headlight unit 21 in accordance with the light distribution patterns set by the light distribution controller 122 of the headlight ECU 11.

In this situation, in the vehicle 100, the camera 23 may capture frontward images of the vehicle 100 on predetermined cycles, and output the captured images to the external monitoring ECU 12. The radar 24 may measure, on predetermined cycles, the positional relation and the distance to other vehicles including the vehicle in front, pedestrians, etc. present around the vehicle 100, and output a result of measurement to the external monitoring ECU 12. When another vehicle is present in front of the vehicle 100, based on the images outputted from the camera 23 or the result of measurement by the radar 24, the external monitoring ECU 12 may output the inter-vehicle distance d indicating the distance from the vehicle 100 to the vehicle in front.

In the headlight ECU 11, the inter-vehicle distance obtainer 121 may acquire the inter-vehicle distance d from the external monitoring ECU 12 through the in-vehicle network 3 (step S11), and monitor whether the inter-vehicle distance d is less than the predetermined distance L1 (step S12). When the inter-vehicle distance d is less than the predetermined distance L1 (YES in step S12), the inter-vehicle distance obtainer 121 may notify the illumination controller 123 of that, to allow the illumination controller 123 to control the headlight unit 21 to displace the illumination range downward (step S13).

In this situation, in the headlight unit 21, when solely the low beam by the low beam unit 21A is being sent out, the illumination range of the low beam may be displaced downward. When the high beam is being sent out while the illumination range is partially shaded by the ADB control, the illumination range of the high beam may be displaced downward.

The inter-vehicle distance obtainer 121 may continuously acquire the inter-vehicle distance d from the vehicle in front to the vehicle 100 even after the illumination range is displaced downward (step S14). Based on the inter-vehicle distance d, the inter-vehicle distance obtainer 121 may determine whether the vehicle 100 has passed the vehicle in front (step S15). If the vehicle 100 has not passed the vehicle in front (NO in step S15), the inter-vehicle distance obtainer 121 may determine whether the inter-vehicle distance d is larger than the predetermined distance L2 (step S16). When the inter-vehicle distance d is larger than the predetermined distance L2 (YES in step S16) and when the vehicle 100 has passed the vehicle in front (YES in step S15), the inter-vehicle distance obtainer 121 may notify the illumination controller 123 of that. The illumination controller 123 may control the headlight unit 21 to restore whichever illumination range has been displaced downward, to the pre-displacement illumination range (step S17).

MODIFICATION EXAMPLE

As the light sources of the low beam unit 21A and the high beam unit 21B, a light source may be applicable in which light emitting elements are arranged in a matrix. In this case, the illumination controller 123 may output, to the headlight unit 21, a driving signal indicating whether or not to light each light emitting element of the low beam unit 21A and the high beam unit 21B in accordance with the light distribution patterns set for the respective illumination ranges.

Moreover, when displacing each illumination range, the illumination controller 123 may control a lighted state of each light emitting element in accordance with the amount of displacement, to displace the illumination range of the low beam and the illumination range of the high beam. That is, the illumination controller 123 may displace the illumination range of the low beam and the illumination range of the high beam by changing the light distribution patterns of the low beam unit 21A and the high beam unit 21B set by the light distribution controller 122.

In one example, the illumination controller 123 may set corrected light distribution patterns in which the light emitting elements illuminating upper portions of the illumination ranges in the pre-displacement light distribution patterns are changed from the lighted state to a non-lighted state, out of the light emitting elements of the light sources of the low beam unit 21A and the high beam unit 21B, and the light emitting elements located even lower than the light emitting elements illuminating lower portions of the illumination ranges are changed from the non-lighted state to the lighted state.

As described, the illumination controller 123 is configured to set the corrected light distribution patterns in which the illumination range of the low beam and the illumination range of the high beam are lowered, and control the headlight unit 21 based on the corrected light distribution patterns. Hence, it is possible to displace each illumination range.

According to this embodiment and the modification example described above, when the inter-vehicle distance d from a subject vehicle, that is, the vehicle 100, to the vehicle in front is less than the predetermined distance L1, at least the illumination range of the low beam is displaced downward. Hence, it is possible to optimize the illumination range and mitigate glare to the oncoming vehicle or the preceding vehicle even in a vehicle including headlights at a high ground level.

In the case where the vehicle in front is an oncoming vehicle, after the illumination range is displaced downward, when the vehicle 100 and the oncoming vehicle pass each other, the displaced illumination range may be restored to an original position. Hence, it is possible to ensure the visibility of the driver of the vehicle 100.

Similarly, in the case where the vehicle in front is a preceding vehicle, after the illumination range is displaced downward, when the inter-vehicle distance d is larger than the predetermined distance L2, with the inter-vehicle distance being large enough to prevent the illumination by the low beam or the high beam by the vehicle 10 from producing glare to the preceding vehicle, the displaced illumination range may be restored to the original position. Hence, it is possible to ensure the visibility of the driver of the vehicle 100.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. The forgoing example embodiments may be combined by diverting the technologies to one another in so far as there is no particular contradiction or issue in their purposes and configurations.

The inter-vehicle distance obtainer 121, the light distribution controller 122, and the illumination controller 123 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of the functions of the inter-vehicle distance obtainer 121, the light distribution controller 122, and the illumination controller 123. Such a medium may take many forms, including, but not limited to, any type of magnetic medium such as a hard disk, any type of optical medium such as a CD or a DVD, any type of semiconductor memory (i.e., semiconductor circuit) such as a volatile memory or a non-volatile memory. The volatile memory may include a DRAM or an SRAM, and the nonvolatile memory may include a ROM or a NVRAM. The ASIC is an integrated circuit (IC) customized to perform its functions, and the FPGA is an integrated circuit designed to be configured after manufacturing in order to perform all or a part of the functions of the inter-vehicle distance obtainer 121, the light distribution controller 122, and the illumination controller 123 illustrated in FIG. 2.

The invention claimed is:

1. A headlight controller configured to control a headlight unit of a vehicle, the headlight unit including a low beam unit configured to emit a low beam and a high beam unit configured to emit a high beam and being configured to illuminate a predetermined range in front of the vehicle, the headlight controller comprising:

an inter-vehicle distance obtainer configured to acquire an inter-vehicle distance between the vehicle and a vehicle in front of the vehicle;

a light distribution controller configured to set, by an adaptive driving beam (ADB) control, a light distribution pattern that partially dims or shades, within an illumination range of the high beam unit, a range corresponding to a position of the front vehicle;

an optical axis adjuster configured to adjust optical axes of the low beam unit and the high beam unit; and an illumination controller configured to, when the inter-vehicle distance is less than a first distance, control the optical axis adjuster to adjust downward by a predetermined amount at least the optical axis of the low beam unit so as to displace downward by the predetermined amount at least an illumination range of the low beam unit, independently of whether the light distribution controller is carrying out the ADB control.

2. The headlight controller according to claim 1, wherein the headlight unit comprises a light source in which light emitting elements are arranged in a matrix.

3. The headlight controller according to claim 1, wherein the illumination controller is configured to, when the vehicle in front is a preceding vehicle traveling ahead of the vehicle in a same direction of advance as the vehicle, restore, to a pre-displacement position, whichever illumination range has been displaced downward from among the illumination range of the low beam unit and the illumination range of the high beam unit, when the inter-vehicle distance between the preceding vehicle and the vehicle is larger than a second distance.

4. The headlight controller according to claim 1, wherein the illumination controller is configured to, when the vehicle in front is an oncoming vehicle with respect to the vehicle, restore, to a pre-displacement position, whichever illumination range has been displaced downward from among the illumination range of the low beam unit and the illumination range of the high beam unit, after the vehicle and the oncoming vehicle pass each other.

5. The headlight controller according to claim 1, wherein the predetermined amount is determined in advance based on a ground level of the headlight unit in the vehicle and is stored in a storage of the headlight controller.

6. The headlight controller according to claim 1, wherein the illumination controller is configured to determine an amount of adjustment for each of the optical axis of the low beam unit and the optical axis of the high beam unit in accordance with an amount of displacement of each illumination range.

7. The headlight controller according to claim 6, wherein the illumination controller is configured to output, to the optical axis adjuster, a driving signal indicating the amount of adjustment for each of the optical axis of the low beam unit and the optical axis of the high beam unit.

8. A headlight controller configured to control a headlight unit of a vehicle, the headlight unit including a low beam unit configured to emit a low beam and a high beam unit configured to emit a high beam and being configured to illuminate a predetermined range in front of the vehicle, the headlight controller comprising circuitry configured to:

acquire an inter-vehicle distance between the vehicle and a vehicle in front of the vehicle;

set, by an adaptive driving beam (ADB) control, a light distribution pattern that partially dims or shades, within an illumination range of the high beam unit, a range corresponding to a position of the front vehicle;

adjust optical axes of the low beam unit and the high beam unit; and when the inter-vehicle distance is less than a first distance, control the optical axis adjuster to adjust downward by a predetermined amount at least the optical axis of the low beam unit so as to displace downward by the predetermined amount at least an illumination range of the low beam unit, independently of whether the ADB control is carried out.

* * * * *